United States Patent [19]

Johnson

[11] Patent Number: 4,535,406
[45] Date of Patent: Aug. 13, 1985

[54] FUEL DISTRIBUTION CONTROL FOR AN INTERNAL COMBUSTION ENGINE

[75] Inventor: Edwin A. Johnson, Clarkston, Mich.

[73] Assignee: Allied Corporation, N.Y.

[21] Appl. No.: 468,817

[22] Filed: Feb. 22, 1983

[51] Int. Cl.³ .............. F02B 3/12; F02D 5/02; F02M 51/00
[52] U.S. Cl. .............. 364/431.08; 123/436; 123/480; 364/431.05
[58] Field of Search .............. 364/431.01, 431.03, 364/431.08; 123/435, 436

[56] References Cited

U.S. PATENT DOCUMENTS

| | | | |
|---|---|---|---|
| 4,044,234 | 8/1977 | Frobenius et al. | 364/431.08 |
| 4,044,235 | 8/1977 | Frobenius | 123/436 |
| 4,044,236 | 8/1984 | Bianchi et al. | 364/431.08 |
| 4,197,767 | 4/1980 | Leung | 364/569 |
| 4,344,140 | 8/1982 | Leung | 364/431.08 |
| 4,345,559 | 8/1982 | Küttner et al. | 123/436 X |
| 4,357,662 | 11/1982 | Schira et al. | 364/431.08 |
| 4,418,669 | 12/1983 | Johnson et al. | 123/436 |
| 4,475,511 | 10/1984 | Johnson et al. | 123/436 |
| 4,476,833 | 10/1984 | Johnson et al. | 123/436 |

Primary Examiner—Felix D. Gruber
Attorney, Agent, or Firm—James R. Ignatowski; Russel C. Wells

[57] ABSTRACT

A fuel distribution control for an internal combustion engine having a fuel control computer and fuel delivery means for delivering fuel to the engine in response to electrical signals. A signal generator generating first signals indicative of the incremental rotational velocity of the engine's output member resulting from the torque impulses imparted to the output member by the individual cylinders, averaging means for generating from said first signal an average rotational velocity signal, a circuit for generating a difference signal indicative of the difference between said first signals and said average rotational velocity signal, integrator means for individually accumulating said difference signals to generate a correction signal for each cylinder, means for averaging said correction signal to generate an average correction signal, means for summing said correction signal with the base fuel quantity signals generated by the fuel control computer to generate intermediate fuel quantity signals, and means for summing the correction signals to said intermediate fuel quantity signal to generate a corrected fuel quantity signal activating the fuel delivery means to deliver a quantity of fuel to each cylinder tending to equalize the contribution of each cylinder to the total output torque of the engine.

22 Claims, 4 Drawing Figures

FUEL DISTRIBUTION CONTROL FOR AN INTERNAL COMBUSTION ENGINE

BACKGROUND OF THE INVENTION

1. Field of the Invention

The invention is related to the field of electronic engine controls and in particular to a closed loop electronic engine control which distributes the delivered quantity of fuel among the individual engine cylinders so as to equalize the contribution of each cylinder to the total output torque of the engine.

2. Prior Art

Fuel distribution engine control systems are known in the art. Schira et al. in U.S. Pat. No. 4,357,662 discloses a closed loop fuel distribution in which the fuel delivered to each cylinder is computed from the amplitude and phase angle of the individual torque impulses to the engine's crankshaft as a function of engine speed. In another type of fuel control system using engine roughness as the sensed parameter to close the loop, Bianchi et al. in U.S. Pat. No. 4,044,236 teaches measuring the rotational periods of the engine's crankshaft between two sequential revolutions of the engine. The differential is digitally measured in an updown counter counting at a frequency proportional to engine speed. In an alternate type of closed loop fuel control system, Frobenius et al. in U.S. Pat. No. 4,044,234 teaches measuring the rotational periods of two equal angular intervals, one before and one after the top dead center position of each piston. The change in the difference between the two rotational periods of the two equal angular intervals for the same cylinder is compared against a reference value and an error signal is generated when the change exceeds the reference value. Frobenius in U.S. Pat. No. 4,044,235 teaches an alternate roughness control system wherein the periods of three sequential revolutions are compared to determine engine smoothness.

In all of the above, the fuel control systems are closed loop and correct the quantity of fuel being supplied by the engine in a closed loop manner. However only Schira et al. disclosed a fuel control system capable of distributing the fuel among the individual engine cylinders to equalize the torque contribution of each cylinder to the total output torque of the engine. Disclosed herein is a closed loop fuel redistribution control system, in which the base quantity of fuel to be delivered to the individual cylinders is computed by a fuel control computer in response to the operational parameters of the engine and the computed base fuel quantities distributed to the individual engine cylinders in response to the differences in the detected torque impulses tending to equalize the contribution of each cylinder to the total output torque.

SUMMARY OF THE INVENTION

The invention is a fuel distribution control for an internal combustion fuel control system having a fuel control computer computing the engine's base fuel requirements in response to the operational parameters of the engine. The fuel distribution control comprises means for detecting the incremental engine speed over equal angular rotational intervals of the engine's crankshaft to generate a first signal indicative of the average engine speed during each individual torque impulse produced by the burning of fuel in the engine's individual cylinders, means for averaging said first signals to produce an average first signal, means for generating a difference signal indicative of the difference between said first signals and said average first signal, means for integrating said first difference signals with respect to each engine cylinder to generate a correction signal, one correction signal for each engine cylinder, means for averaging the correction signals to generate an average correction signal, means for summing said correction signal with said average correction and the base fuel quantity signal generated by the fuel control computer to generate a corrected fuel quantity signal having a value equalizing the torque impulses produced by the individual cylinder.

The object of the invention is to distribute the fuel being supplied to the engine among the engine cylinders such as to equalize the torque contribution of each cylinder to the total output torque of the engine. Another object of the invention is to distribute the fuel among the engine cylinders without increasing or decreasing the total quantity of fuel as calculated by the fuel control computer. These and other objectives will become more apparent from reading the detailed description of the invention in conjunction with the drawings.

DETAILED DESCRIPTION OF THE INVENTION

Figure 1:
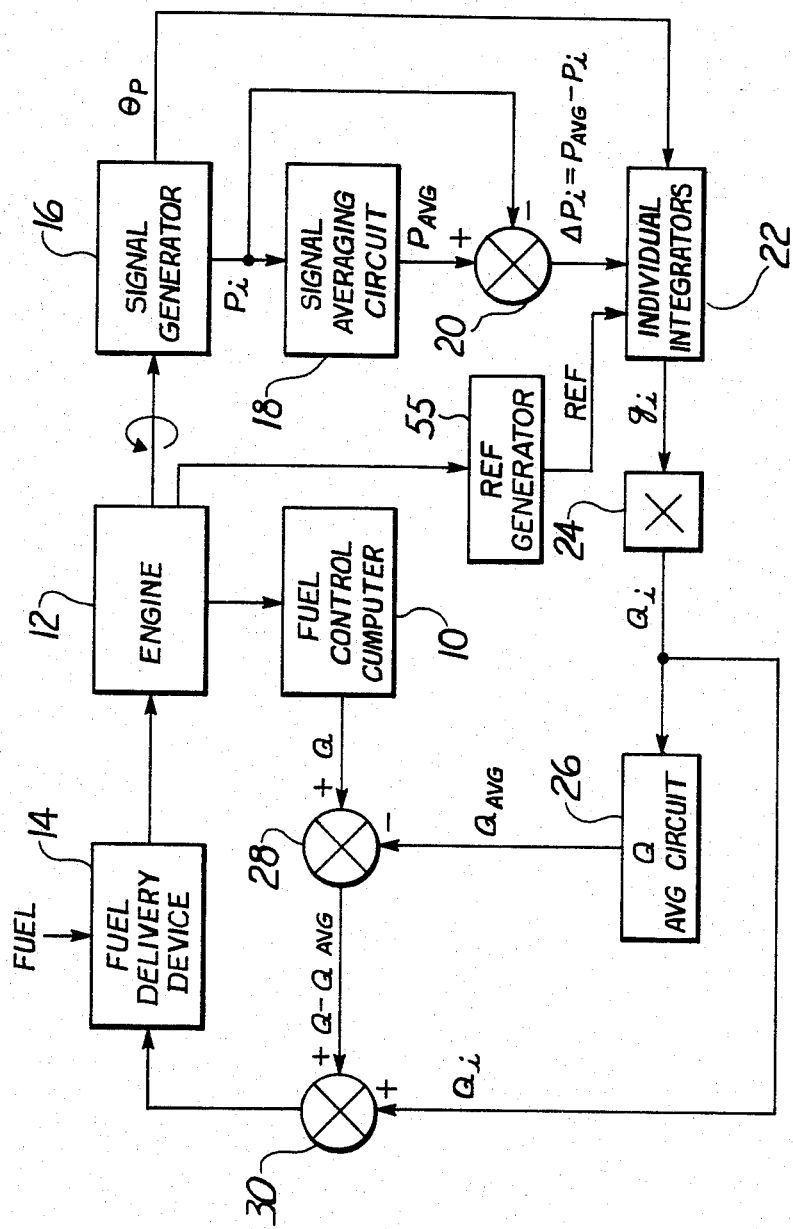
FIG. 1 is a block diagram of the fuel distribution system.

Referring to FIG. 1, a Fuel Control Computer 10, in response to the operational parameters of a multiple cylinder 12, generates a base fuel quantity signal Q indicative of the engines fuel requirements. The Fuel Control Computer 10 may be of any type known in the art. A Fuel Delivery Device 14 such as one or more fuel injectors or an electronically controlled carburetor is activated by the Fuel Control Computer 10 to deliver a quantity of fuel to each cylinder of the Engine 12 proportional to the value of the base fuel quantity signal Q.

A Signal Generator 16 responsive to the rotation of an output member of Engine 10 generates rotational position signals Op indicative of predetermined equally spaced rotational positions of the output member and first signals "$P_i$" indicative of the average engine speed between predetermined equal rotational intervals of the engines output member such as the rotational interval of the engine's crankshaft between successive rotational signals Op, of each piston in turn being at its top dead center position prior to its power stroke. The first signals "$P_i$" may be indicative of the average engine speed during the rotational interval or preferably the time or period required for the engine's crankshaft to rotate through each of the equal rotational intervals.

The first signals $P_i$ are then averaged in Signal Averaging Circuit 18 to generate an average first signal $P_{AVG}$. The Average Signal Generator 18 computes the average signal $P_{AVG}$ having a value:

$$P_{AVG} = \left( \sum_{i=1}^{N} P_i \right) / N$$

where N is the number of samples. N may be the number of cylinders in the engine or any other number as is known in the art.

A Difference Circuit 20 subtracts the first signal $P_i$ from the average first signal $P_{AVG}$ to generate a difference signal $\Delta P_i$ for each first signal. Individual Integrators 22 responsive to a reference signal and the rotational position signals Op sum the difference signals $\Delta P_i$ to generate a plurality of preliminary correction signals $q_i$, one for each of the engine's cylinders. The individual preliminary correction signals $q_i$ are then multiplied by a constant in Multiplier Circuit 24 to generate fuel quantity correction signals $Q_i$.

The correction signals $Q_i$ generated for each cylinder are then averaged in an Averaging Circuit 26 to generate an average correction signal $Q_{AVG}$ having a value $$Q_{AVG} = \left( \sum_{i=1}^{N} Q_i \right) / N$$

where N is the number of cylinders in the engine. The average correction signal $Q_{AVG}$ is then subtracted from the base fuel quantity signal Q generated by the Fuel Control Computer 10, in a Subtraction Circuit 28 to generate an intermediate fuel quantity signal having the value $Q - Q_{AVG}$. The correction signal $Q_i$ is then added to the intermediate fuel quantity signal in Adder Circuit 30 to generate a corrected fuel quantity signal $Q - Q_{AVG} + Q_i$ for the "i"th engine cylinder. The Fuel Delivery Device 14 responds to the corrected fuel quantity signal to deliver a quantity of fuel to the "i"th cylinder tending to equalize the duration of the first signals $P_i$ generated by each of the engine's cylinders. It is further recognized that in volumetric fuel delivery devices where the injection is controlled as a function of output member's angle, further modification of the corrected fuel quantity signal as a function of engine speed will be required. Those skilled in the art will recognize that when the first signals $P_i$ become equal, the torque contribution of each cylinder to the total output torque are likewise equal.

Since the quantity of fuel, N times $Q_{AVG}$ subtracted from the base fuel quantity during a complete engine cycle is equal to the amount $$\sum_{i=1}^{N}$$

$Q_i$ added back to the base fuel qualtity Q, the quantity of fuel delivered to the engine during each operational cycle remains the same as the quantity N times Q computed by the Fuel Control Computer 10. The distribution control does not add or subtract from the basic calibration of the fuel control system, but only distributes the fuel among the individual cylinders in a way tending to equalize the torque contribution of each cylinder to the total output torque of the engine. This distribution control results in a smoother and more efficient operation of the engine and also is capable of compensating for mechanical and/or geometrical differences which otherwise would cause the torque contributions of the individual cylinders to differ.

A person skilled in the art will recognize that Subtraction Circuit 20 may be arranged to generate a difference signal $\Delta P_i$ having a value $P_i - P_{AVG}$. When this change is made to the circuit shown on FIG. 1 the corrected fuel quantity signal will have a value equal to $Q + Q_{AVG} - Q_i$. Accordingly Subtraction Circuit 28 will become an Adder adding $Q_{AVG}$ to Q and Adder 30 will become a Subtraction Circuit substracting $Q_i$ from the sum $Q + Q_{AVG}$. The result will be the same.

Figure 2:
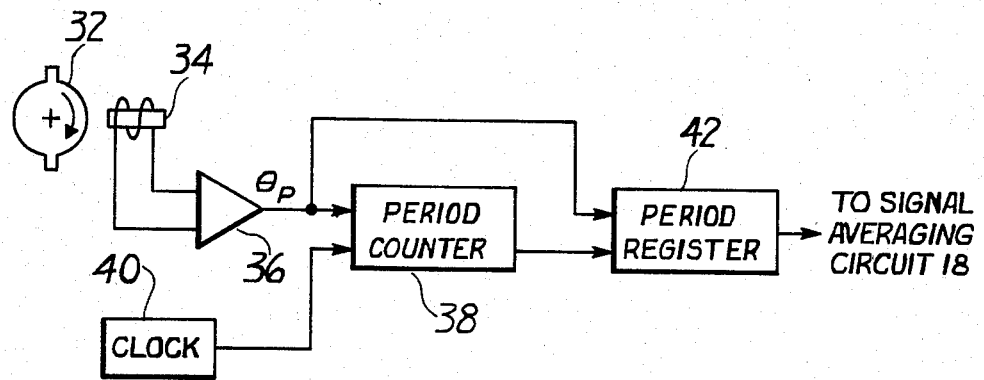
FIG. 2 is a circuit diagram of the period signal generator.

The details of the Signal Generator 18 are shown in FIG. 2. The Signal Generator 18 will be discussed with reference to a 4 cylinder engine, but its principles are equally applicable to all multiple cylinder engines. Referring to FIG. 2 a magnetic pick-up 34 detects the passing of the teeth on a rotating wheel 32 attached a rotating output member of the engine, such as the engine's crankshaft and generates a signal which is amplified by amplifier 36. The rotating wheel 32 has two teeth displaced at 180° intervals such that magnetic pick-up 34 produces 4 output signals, one for each cylinder, during each operational cycle of the engine, i.e. two revolutions of the engines crankshaft. The two teeth on wheel 32 may be positioned such that one of them is adjacent to the magnetic pick-up 34 each time a piston in one of the cylinders is at its top-dead-center position. Any other rotational position of the crankshaft may be used if desired.

Amplifier 36 amplifies the output signal of magnetic pick-up 34 and generates a rotational position signal "$\theta_p$" at precisely 180° rotational intervals of the engines crankshaft. A Period Counter 38 counts the pulses generated by a Clock 40 between successive rotational position signals $\theta_p$. At the end of each 180° rotational interval of the crankshaft, the content of the Period Counter 38 is a number indicative of the time required by the crankshaft to rotate through the 180° interval. As is known in the art this number is inversely proportional to the average engine speed during this same rotational interval and is said first signal "$P_i$".

At the end of each 180° rotational interval, indicated by the occurrence of a rotational position signal $\theta_p$, the content of the Period Counter 38 is transferred to a Period Register 42 where it is temporarily stored. This clears Period Counter 38 and Period Counter 38 begins to count clock pulses again to generate a number indicative of the time required by the crankshaft to rotate through the next 180° rotational interval.

The contents of Period Register 42 is subsequently transferred to the Signal Averaging Circuit 18 where it is averaged with the content of Period Register 42 for the preceeding 180° rotational intervals to generate the signal $P_{AVG}$ indicative of the average time it took the crankshaft to rotate through each 180° interval during a complete operational cycle of the engine.

As previously indicated, the Signal Averaging Circuit 18 may compute the average first signal in accordance with the equation:

$$P_{AVG} = \left( \sum_{i=1}^{N} P_i \right) / N$$

or may generate an equivalent average signal as taught in U.S. Pat. No. 4,197,767 for computing the average phase angle.

Figure 3:
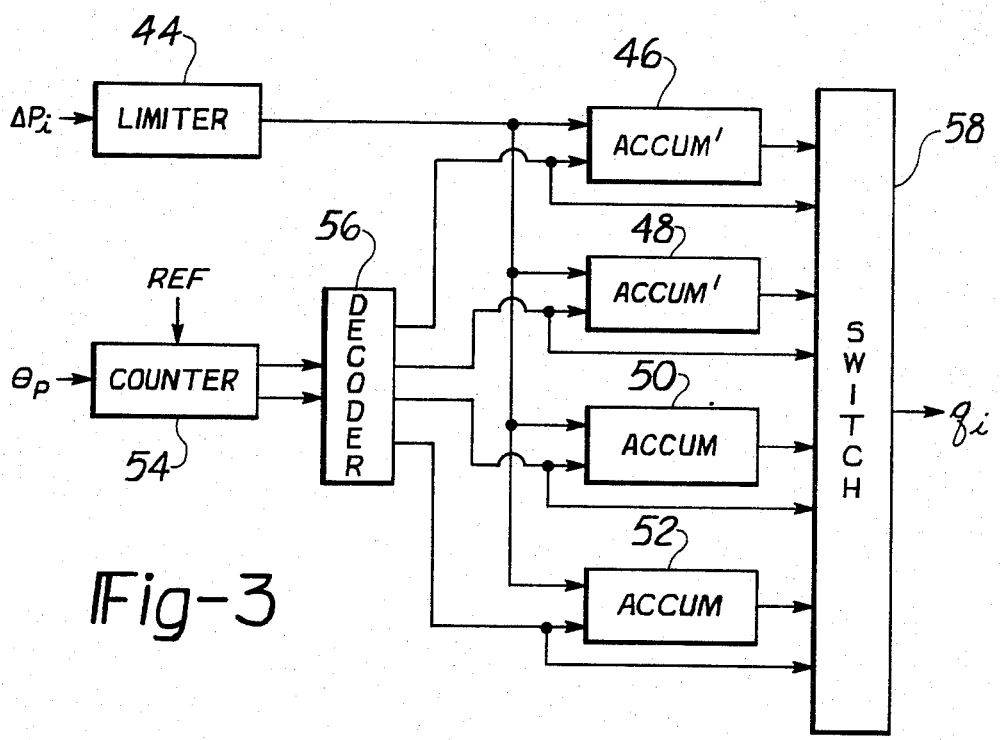
FIG. 3 is a circuit diagram of the integator 22 of FIG. 1.

The details of the Individual Integrators 22 are shown on FIG. 3. The difference signals $\Delta P_i$ from the subtraction circuit 20 are received by a Limiter 44 which limits the absolute value of the difference signal $\Delta P_i$ to a maximum value to prevent start-up, an occasional misfire or similar events from excessively distorting the value of the generated preliminary correction signals $q_i$. The limited value of the difference signal $\Delta P_i$ is applied to a plurality of Accumulators 46 through 52. Since in the given example, the fuel distribution control is for a four (4) cylinder engine, there are four Accumulators, one for each cylinder.

A Counter 54, such as a two bit counter, receives the position signals $\theta_p$ generated at the beginning of each torque impulse to be analyzed. The Counter 54 also receives a cylinder reference signal (REF) from a reference Generator 55 which is indicative of the beginning of the torque impulse for a predetermined one of the four cylinders. The cylinder reference signal REF resets the Counter 54 at the beginning of each engine cycle. The Counter 54 then counts the position signals $\theta_p$ and generates a number indicative of the cylinder whose torque impulse is being analyzed. The current number in Counter 54 is received by a Decoder 56 which generates a signal enabling one of the Accumulators 46 through 52, corresponding to the number in Counter 54, to receive and store the limited difference signal $\Delta P_i$. The Accumulators 46 through 52 are thus activated one at a time in a predetermined sequence to receive and store the difference signals $\Delta P_i$. The accumulated difference signals $\Delta P_i$ in each of the Accumulators is the preliminary correction signal $q_i$ for its associated cylinder.

The outputs of Decoder 56 are also applied to a Switch 58 which transmits the preliminary correction signal $q_i$ to the Multiplier 24 where it is multiplied by a constant to generate the correction signal $Q_i$. The sequence in which the Switch 58 connects the outputs of the individual Accumulators 46 through 52 to Multiplier 24 is selected so that the preliminary correction signals $q_i$ transmitted to Multiplier 24 is the preliminary correction signal for the engine cylinder whose fuel quantity Q is currently being computed.

Figure 4:
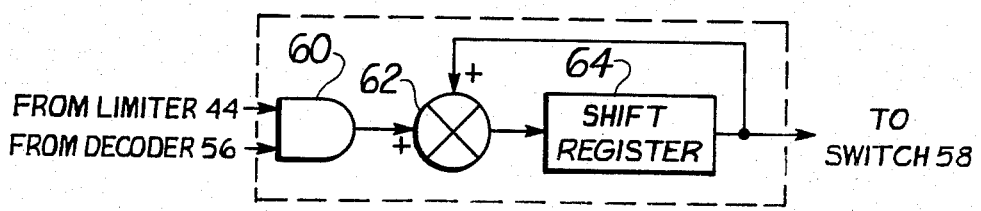
FIG. 4 is a circuit diagram of the individual accumulators 46 through 52.

The details of the Accumulators 46 through 52 are shown in FIG. 4. Since all of the Accumulators are identical, only Accumulator 46 will be explained in detail. Referring to FIG. 4, the output of Limiter 44 and one of the outputs of Decoder 56 are received at alternate inputs to AND Gate 60. The output of AND Gate 60 is connected to one input of Adder 62 having its output connected to Shift Register 64. The output of Shift Register 64 is connected to Switch 58 and to the other input to Adder 62. Therefore, each time a difference signal is generated for a particular cylinder, the AND Gate 60 in the corresponding Accumulator is enabled by the output of Decoder 56 and the difference signal $\Delta P_i$ is added to the content of Shift Register 64. As the resultant distribution of fuel takes place, the difference signals $\Delta P_i$ for all of the cylinders approach zero. Therefore the values stored in each of the Shift Registers 64 become stabilized at a finite value which is indicative of the correction to the fuel quantity of its associated cylinder necessary to equalize the torque contribution of the engine cylinders to the total output torque of the engine.

It is not intended that the invention be limited to the embodiment shown in the appended drawings and discussed in the detailed description of the invention. It is recognized that the functions of the hardwired circuits shown may alternatively be performed by a programmed microprocessor or computer. It is further recognized that those skilled in the art may conceive other ways of performing these same functions without departing from the spirit of the invention as described herein and set forth in the appended claims.

What is claimed is:

1. A fuel distribution control for a multiple cylinder internal combustion engine having a rotary output member, a fuel control computer responsive to the operational parameters of the engine for generating base fuel quantity signals, fuel delivery means responsive to fuel delivery signals for delivering fuel to each engine cylinder, and an operational cycle in which each cylinder produces a torque impulse rotating the engine's output member; the fuel distribution control characterized by:

means for detecting predetermined rotational positions of the engine's output member to generate sequential position signals indicative of equal rotational intervals of the output member during an operational cycle of the engine, each of said equal rotational intervals being associated with the torque impulses produced by one of the engine cylinders;

means for detecting when of of the engine cylinders has a predeterminable state to generate a reference signal once during each engine operational cycle.

means for measuring the time between sequential position signals to generate period signals indicative of the time required by the output member to rotate through each of said equal rotational intervals, means for averaging said period signals to generate an average period signal, difference means for subtracting said period signals and said average period signal, one from the other, to generate a set of difference signals, one of said difference signals associated with each of said torque impulses;

integrator means responsive to said reference and said position signals for accumulating said difference signals with respect to each of said rotational intervals to generate a set of correction signals, one correction signal associated with each of the engine cylinders;

means for averaging said set of correction signals to generate an average correction signal; and means for summing said correction signals one at a time and in a predetermined sequence, with said average correction signal and said base fuel quantity signal to generate fuel delivery signals activating said fuel delivery means to deliver a quantity of fuel to each engine cylinder tending to equalize the torque impulse produced by all of the engine's cylinders and equalize the contribution of each engine cylinder to the total torque output of the engine.

2. The distribution control of claim 1 wherein said means for measuring the time between sequential position signals comprises:

a clock generating clock pulses at a predetermined frequency, and counter means for counting the number of clock pulses generated between sequentially generated position signals to generate said period signal.

3. The control system of claim 1 wherein said integrator means comprises:
  decoder means for generating sequential cylinder designating signals in response to said reference and said position signals,
  a plurality of accumulators, one associated with each cylinder, said plurality of accumulators enabled one at a time in a first predetermined sequence by said cylinder designating signals to store said difference signals generated in response to the torque impulses produced by the associated cylinder, wherein said stored difference signals in each accumulator are said correction signals; and
  switch means connected to the outputs of said plurality of accumulators for selecting said fuel quantity signals stored in said accumulators, one at a time in a second predetermined sequence in response to said sequential cylinder designating signals, said second predetermined sequence selecting the correction signal stored in the accumulator corresponding to the engine cylinders whose fuel requirements are currently being computed by the fuel control computer.

4. The control system of claim 3 wherein said integrator means further includes a multiplier for multiplying the correction signal selected by said switch means by a constant.

5. The control system of claim 4 wherein said means for summing comprises:
  subtraction means for subtracting said average correction signal from said base fuel quantity signal to generate an intermediate fuel quantity signal; and
  adder means for adding said individual fuel quantity correction signals to said intermediate fuel quantity signal to generate said corrected fuel delivery signals.

6. The control system of claim 1 wherein said means for summing comprises:
  subtraction means for subtracting said average correction signal from said base fuel quantity signal to generate an intermediate fuel quantity signal; and
  adder means for adding said individual correction signals to said intermediate fuel quantity signal to generate said fuel delivery signals.

7. A fuel control system for a multiple cylinder internal combustion engine having an operational cycle in which each cylinder produces a torque impulse rotating an output member and means for delivering fuel to the engine in response to electrical signals, said fuel control system comprising:
  fuel control computer means for generating base fuel quantity signals in response to the operational parameters of the engine;
  means for detecting predetermined rotational positions of the engine's output member to sequentially generate position signals indicative of equal rotational intervals of the output member during an operational cycle of the engine, each of said equal rotational intervals being associated with the torque impulses produced by one of the engine's cylinders;
  means for detecting when one particular cylinder has a predetermined state to generate a reference signal once during each engine operational cycle;
  means for measuring the time between sequential position signals to generate period signals indicative of the time required by the output member to rotate through each of said rotational intervals;
  means responsive to said period signals for generating an average period signal indicative of the average rotational velocity of the output member for at least one operational cycle of the engine;
  means for generating difference signals having a value equal to the difference between said period signals and said average period signals;
  integrator means responsive to said reference and position signals for accumulating said difference signals with respect to each cylinder of the multiple cylinder engine to generate fuel quantity correction signals, one for each of said cylinders, said integrator means including means for outputing the fuel quantity correction signal associated with the engine cylinder for which said fuel control computer is computing said base fuel quantity signal,
  means for averaging said fuel quantity correction signals over at least one complete operational cycle of the engine to generate an average fuel quantity correction signal; and
  means for summing said average fuel quantity correction signal with said fuel quantity correction signal and said base fuel quantity signal to generate electrical signals activating the delivery means.

8. The fuel control system of claim 7 wherein said means for measuring comprises:
  a clock generating clock pulses at a predetermined frequency; and
  counter means for counting said clock pulses between sequentially generated position signals to generate said period signals, each period signal having a value corresponding to the number of clock pulses counted in it's associated rotational interval.

9. The fuel control system of claim 8 wherein said intergrator means comprises:
  decoder means for generating repetitive sets of cylinder designating signals in response to said reference and said position signals, each set of cylinder designating signals having one cylinder designating signal associated with each cylinder;
  a plurality of accumulators, one for each engine cylinder, said plurality of accumulators enabled one at a time in a first predetermined sequence by said cylinder designating signals to accumulate the difference signals generated in response to torque impulses produced by the associated cylinder, wherein said accumulated difference signals in each accumulator are said fuel quantity correction signals; and
  switch means connected to the outputs of said plurality of accumulators for outputting said fuel quantity correction signals from said accumulators, one at a time, in a second predetermined sequence in response to said cylinder designating signals, said second predetermined sequence outputting the fuel quantity correction signal accumulated in the accumulator associated with the engine cylinder whose fuel requirements are currently being computed by the fuel control computer.

10. The fuel control system of claim 9 wherein said integrator means further includes a multiplier for multiplying the fuel quantity correction signal output from said switch means by a constant.

11. The fuel control system of claim 9 wherein said means for generating a difference signal subtracts said period signals from said average period signal, said means for summing comprises:

subtraction means for subtracting said average fuel quantity correction signal from said base fuel quantity signal to generate an intermediate fuel quantity signal; and adder means for adding said fuel quantity correction signals to said intermediate fuel quantity signal to generate the electrical signals activating the fuel delivery means to deliver a quantity of fuel to each engine cylinder tending to equalize the torque contributions of each cylinder to the total output torque of the engine.

12. The fuel control system of claim 9 wherein said means for generating a difference signal subtracts said average period signals from said period signal, said means for summing comprises:

means for adding said average fuel quantity correction signal to said base fuel quantity signal to generate an intermediate fuel quantity signal; and means for subtracting said fuel quantity correction signals from said intermediate fuel quantity signal to generate the electrical signals activating the fuel delivery means to deliver a quantity of fuel to each engine cylinder tending to equalize the torque contributions of each cylinder to the total output torque of the engine.

13. A method for distributing the fuel quantity being delivered to the individual cylinders of a multiple cylinder internal combustion engine having a rotatable output member which rotates through a predetermined angle during each operational cycle of the engine comprising the steps of:

detecting the operational parameters of the engine to generate base fuel quantity signals;

detecting predetermined rotational positions of the engine's output member dividing the predetermined angle of the engine's operational cycle into a plurality of equal angular intervals equal in number to the number of cylinders in the engine;

detecting a predetermined state of one of said engine cylinders to generate a reference signal once during each operational cycle of the engine;

measuring the time required by the output member to rotate through each of said equal angular intervals to generate sequential period signal indicative of the magnitude of the torque impulses imparted to the engine's output member by the burning of fuel in the individual engine cylinder;

averaging said sequential period signals to generate an average period signal indicative of the average rotational velocity of the engine's output member;

subtracting said sequential period and said average period signals, one from the other, to sequentially generate difference signals;

activating a plurality of accumulators in response to said reference and said position signals to individually accumulate said difference signals with respect to each cylinder to generate fuel quantity correction signals for the associated engine cylinder;

averaging said fuel quantity correction signals from all of the accumulators to generate an average fuel quantity correction signal;

summing said base fuel quantity signal with said average fuel quantity correction signal and the fuel quantity correction signal associated with the cylinder to which fuel is to be delivered to generate fuel quantity signals; and activating a fuel delivery means with said corrected fuel quantity signals to deliver a quantity of fuel to each engine cylinder tending to equalize the magnitude of the torque impulses.

14. The method of claim 13 wherein said step of measuring the time comprises the steps of:

generating clock pulses at a predetermined frequency substantially higher than the rotational speed of the engine, and counting the clock pulses generated between sequentially generated position signals to generate said period signals.

15. The method of claim 14 wherein said step of activating a plurality of accumulators comprises the steps of:

decoding said reference and position signals to generate a repetitive set of cylinder designating signals having a cylinder designating signal associated with each cylinder;

sequentially enabling a plurality of accumulators, one associated with each engine cylinder, in a first predetermined sequence determined by said repetitive set of cylinder designating signals to accumulate said difference signals, each accumulator accumulating the difference signals generated in response to the torque impulse produced by its associated cylinder; and enabling a switch means with said repetitive set of cylinder designating signals to output the content of each accumulator in a second predetermined sequence, said second predetermined sequence outputting the content of the accumulator associated with the cylinder whose fuel requirements are currently being computed, and wherein the contents of said accumulators are said fuel quantity corrected signals.

16. The method of claim 15 wherein said step of subtracting to generate a difference signal subtracts said period signal from said average period signal, said step of summing includes the steps of:

subtracting said average fuel quantity correction signal from said base fuel quantity signal to generate an intermediate fuel quantity signal; and adding said fuel quantity correction signal to said intermediate fuel quantity signal to generate said corrected fuel quantity signal.

17. The method of claim 15 wherein said step of subtracting to generate a difference signal subtracts said average period signal from said period signal, said step of summing includes the steps of:

adding said average fuel quantity correction signal to said base fuel quantity signal to generate an intermediate fuel quantity signal; and subtracting said fuel quantity correction signal from said intermediate fuel quantity signal to generate said corrected fuel quantity signal.

18. The method of claim 15 wherein said step of generating a difference signal subtracts said first signals from said average first signal, said step of summing includes the steps of:

subtracting said average fuel quantity correction signal from said base fuel quantity signal to generate an intermediate fuel quantity signal; and adding said fuel quantity correction signal to said intermediate fuel quantity signal to generate said corrected fuel quantity signal.

19. The method of claim 15 wherein said step of generating a difference signal subtracts said average first signal from said first signal, said step of summing includes the steps of:

adding said average fuel quantity signal to said base fuel quantity signal to generate an intermediate fuel quantity signal; and subtracting said fuel quantity correction signal from said intermediate fuel quantity signal to generate said corrected fuel quantity signal.

20. A method for distributing the fuel being delivered to a multiple cylinder internal combustion engine having an output member rotatable through a predetermined angle during each operational cycle of the engine, fuel control computer means for generating base fuel quantity signals in response to the operational parameters of the engine, and fuel delivery means for delivering fuel to the cylinders in response to fuel delivery signals, and wherein the burning of the fuel in the individual cylinders produces torque impulses rotating the output member, said method comprising the steps of:

detecting predetermined rotational positions of the engine's output member to generate position signals dividing the predetermined angle of the engine's operational cycle into equal angular increments equal in number to the number of cylinders in the multiple cylinder engine;

detecting a predetermined state of one particular cylinder to generate a reference signal once during each operational cycle of the engine;

measuring the time between said position signals to generate sequential first signals indicative of the magnitude of individual torque impulses imparted to the output member by the cylinders;

averaging said sequentially generated first signals to generate an average first signal;

subtracting said first signal and said average first signal, one from the other, to generate difference signals;

activating a plurality of accumulators with said reference and said position signals to individually accumulate said difference signals with respect to each cylinder to generate fuel quantity correction signals for each cylinder;

averaging the fuel quantity correction signals for all of the cylinders to generate an average fuel quantity correction signal;

summing said base fuel quantity signal with said average fuel quantity correction signal and the fuel quantity correction associated with cylinder to which fuel is to be delivered to generate a corrected fuel quantity signal; and activating fuel delivery means with said corrected fuel quantity signals to deliver a quantity of fuel to each engine cylinder tending to equalize the contribution of each cylinder to the total output torque of the engine.

21. The method of claim 20 wherein said step of measuring the time comprises the steps of:

generating clock pulses at a predetermined frequency substantially higher than the rotational speed of the engine; and counting the clock pulses generated between sequentially generated position signals to generate said sequentially generated first signal.

22. The method of claim 21 wherein said step of activating a plurality of accumulators comprises the steps of:

decoding said reference and said position signals to generate a repetitive set of cylinder designating signals, each set of cylinder designating signals having a cylinder designating signal associated with each cylinder;

sequentially enabling said plurality of accumulators in a first predetermined sequence determined by said repetitive set of cylinder designating signals to store said difference signals, each accumulator storing the difference signals generated in response to the torque impulse produced by its associated cylinder; and enabling a switch means with said repetitive set of cylinder designating signal to output the content of each accumulator in a second predetermined sequence, said second predetermined sequence outputting the content of the accumulator associated with the cylinder whose fuel requirements are currently being computed, and wherein the contents of said accumulators are said fuel quantity correction signal.

* * * * *

UNITED STATES PATENT AND TRADEMARK OFFICE
CERTIFICATE OF CORRECTION

PATENT NO. : 4,535,406
DATED : August 13, 1985
INVENTOR(S) : Edwin A. Johnson

It is certified that error appears in the above-identified patent and that said Letters Patent are hereby corrected as shown below:

Column 6, line 27, "when of" should read -- when one --

Signed and Sealed this

Eleventh Day of March 1986

[SEAL]

Attest:

DONALD J. QUIGG

Attesting Officer

Commissioner of Patents and Trademarks